Oct. 13, 1964 H. S. RAHME ETAL 3,152,471

PERMEABILITY MEASUREMENT

Filed Dec. 9, 1960

INVENTORS

HABIB S. RAHME

BY GEORGE G. BERNARD

Edward H. Sang

ATTORNEY 3,152,471

PERMEABILITY MEASUREMENT

Habib S. Rahme and George G. Bernard, Crystal Lake, Ill., assignors to The Pure Oil Company, Chicago, Ill., a corporation of Ohio Filed Dec. 9, 1960, Ser. No. 74,854
5 Claims. (Cl. 73—38)

This invention relates to the measurement of the permeability of porous specimens, such as earth formations, and more particularly to an apparatus and method for determining the permeability of oil-well cores to radial flow.

In testing oil-well cores for their physical properties, it is common to determine the permeability and porosity of the core. Permeability is a measure of the ability of the core to transmit a fluid, and since most cores are heterogeneous in structure, the permeability of the core to flow in different directions will not be the same.

Cores obtained from subterranean formations are generally cylindrical in shape, the axis of the core lying in a substantially vertical direction before removal of the core from the formation. The flow of fluid from or into the well bore being in a radial direction, it becomes of paramount importance to determine the permeability of the core to radial flow. Prior art techniques measured the permeability of cylindrical cores by flowing test fluids axially through the cores, and while these methods produced permeability determinations representative of the flow in the selected direction, serious difficulties arose in attempting to apply these results to estimate the flow properties of the formation surrounding the well bore in a substantially planar, radial direction. Where the cores are highly heterogeneous, as is frequently the case, permeability determinations made by axial-flow techniques may be misleading.

The prior art has recognized the desirability of making permeability determinations in a direction parallel to the bedding plane of the core before it is removed from the formation, and this has been accomplished by shaping the core to produce a cylinder-like specimen having an axis perpendicular to the axis of the original core. This method has not proved entirely satisfactory, first of all because the direction of flow, while parallel to the bedding plane of the original core, is still linear rather than radial, and further because the effective volume of the specimen tested is so greatly reduced that the heterogeneities existing in the specimen may produce misleading results. In short, the sample selected is too small to be representative of the formation permeability.

It is an object of this invention to provide a method and apparatus for determining the permeability of a porous, cylindrical specimen in a radial direction by flowing fluid radially inward from the periphery of the specimen in a direction parallel to the bedding plane. Another object of this invention is to provide a method and apparatus by which the permeability of porous specimens can be conveniently determined. Still another object of this invention is to provide an apparatus and method for determining the permeability of a core in a direction parallel to the core bedding-plane without the necessity of reshaping the core initially obtained from a subterranean formation.

Briefly, in the method of this invention the permeability of a cylindrical specimen is determined by causing a test fluid to enter the cylindrical specimen radially, thereby achieving flow in the same direction as in the reservoir. Because the test is conducted under flow, and the flow is in the same direction as in the reservoir, the results permit the computation of more meaningful permeabilities which in turn permit the formulation of more accurate predictions of reservoir production characteristics.

The invention is best described with reference to the drawing of which:

Figure 1:
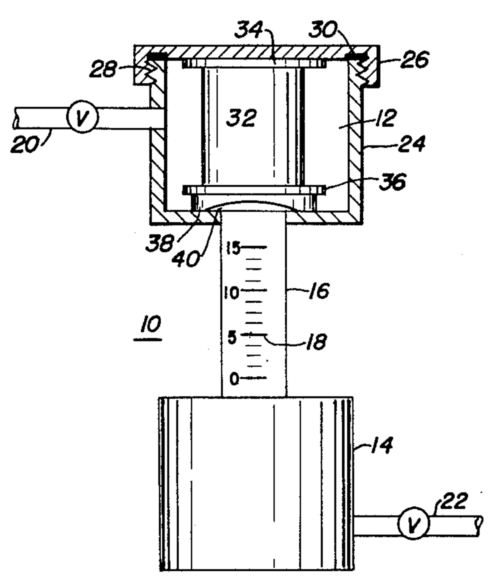
FIGURE 1 is a frontal view, partially in section, of the apparatus of this invention.

Referring to FIGURE 1, test container 10 comprises a first chamber 12 and a second lower chamber 14, the two chambers being communicated through tube 16, which is fabricated of a transparent material such as glass, and provided with a graduated scale 18 which may conveniently read in cubic centimeters. The chambers 12 and 14 may be fabricated from any suitable material, such as steel. Valve-controlled conduit 20 communicates with chamber 12, while valve-controlled conduit 22 communicates with chamber 14. The chamber 12 includes a cup-shaped bottom and side-wall portion 24, and a closure portion 26, the cup-shaped portion and closure being secured together by means of threads 28. A seal 30 is provided to make the chamber fluid tight.

Disposed within chamber 12 is core 32. This core is cylindrical in shape, and for this reason the chamber 12 is preferably also cylindrical. Two resilient disc-shaped spacers 34 and 36 are provided adjacent to the upper and lower flat ends of cylindrical core 32. Base spacer 38, upon which resilient spacer 36 rests, is provided with recess 40 which permits the entry of fluid from tube 16 into chamber 12. The resilient spacers 34 and 36 are preferably fabricated of a material which is impervious to the test fluid to be used to determine the porosity of the specimen, and is sufficiently resilient to provide an efficient seal for the upper and lower flat surfaces of the cylindrical specimen. It is evident that as lid 26 is screwed in place to close chamber 12, resilient spacers 34 and 36 together with base spacer 38 cooperate to provide means for supporting the core. In this manner the specimen is held rigidly in place, without interfering with the entry of fluid into the peripheral surfaces thereof.

Figure 2:
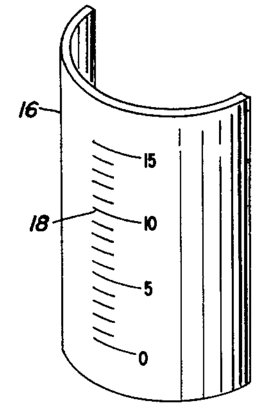
FIGURE 2 is a perspective view of a graduated scale which may be employed with the apparatus of FIGURE 1.

In the preferred method of use of the apparatus of this invention, a cylindrical test specimen (core) is inserted in chamber 12, and is supported by resilient discs, such as 34 and 36. If desired, the flat upper and lower surfaces of the cylindrical specimen may be coated with a thin layer of liquid-impervious material to prevent fluid entry through these surfaces. Pre-test treatment of the core may sometimes be necessary to insure that the liquid content thereof has been removed. This can be accomplished by flooding the core with a solvent, such as acetone, and then evacuating the core to remove the solvent. Lid 26 is screwed tightly in place so that resilient discs 34 and 36 support the test specimen, and so that seal 30 is compressed to prevent leakage of air into chamber 12. A vacuum pump is then applied to valve-controlled conduit 20 to evacuate the entire test container. A test liquid, such as water, is then introduced through valve-controlled conduit 22 into chamber 14 to fill graduated tube 16 to the desired level. The quantity of water introduced is preferably sufficient to fill container 12, with the specimen and specimen supporting means therein, and also to fill tube 16 to the zero graduation. Since the volumes of chambers 12 and 14 are known, and the volumes of the specimen and specimen holders are further known, the quantity of water to be introduced can conveniently be calculated. In some instances, due to irregularity of the test specimen, the volume of water to be introduced cannot be ascertained with accuracy, and an approximation may be used. In such instances, it is desirable to provide a graduated, transparent, tubular segment as shown in FIGURE 2. The tubular segment is preferably fabricated of a flexible, transparent plastic, the arc of the segment being slightly greater than 180°, and the radius of the segment being the same as the outside radius of tube 16. Thus the graduated tubular segment will snap in place around the periphery of the tube 16, but will be axially slidable with respect to the tube.

Figure 3:
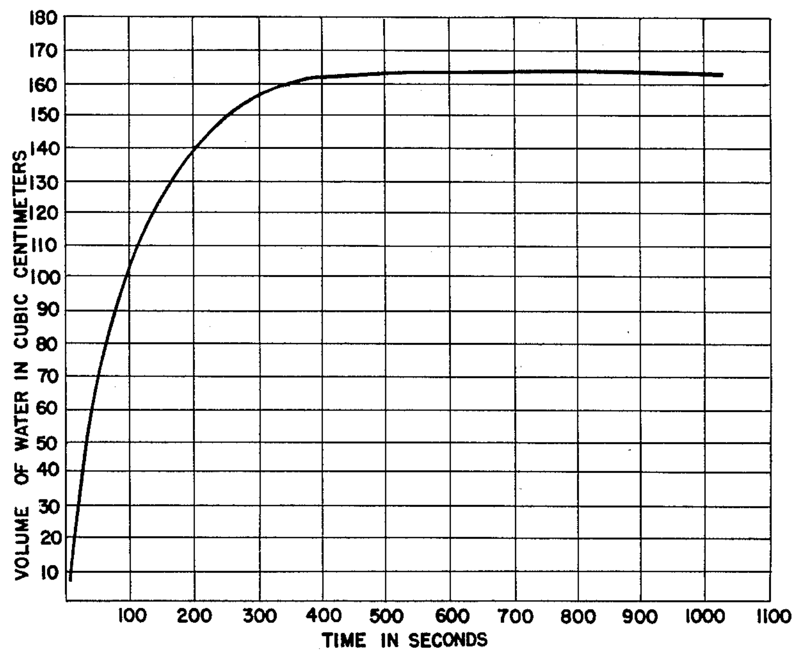
FIGURE 3 is a graph depicting the volume of liquid influx into a core as a function of time.

After the desired quantity of liquid has been introduced into chamber 14, the valve is closed. It is evident that the pressure within the system will be the sum of the vapor pressure of the introduced liquid and the absolute pressure to which the vessel was evacuated. The apparatus is now inverted so that the liquid flows downward through tube 16 and fills chamber 12. If the proper amount of fluid was introduced, the meniscus level in tube 16 will be at the zero indicia. If the sliding tubular segment depicted in FIGURE 2 is to be used, it will be adjusted to place the zero indicia at the meniscus level. Now conduit 22 is opened to the atmosphere, and entry of fluid into the specimen begins. It is evident that no fluid will enter the specimen prior to the opening of conduit 22 since the pressure within and without the specimen is almost identical. After flow into the specimen has begun, and during the period of flow, the level of fluid in tube 16 is recorded at a plurality of instances, and the time interval between these instances is also recorded. The results of a test using a formation core as the test specimen, and water as the test liquid, are shown in FIGURE 3.

The permeability of the test specimen can be calculated from the data obtained in the foregoing test. The permeability of the core sample, in darcies, to radial flow is calculated from the formula:

$$k=\frac{\mu Q_t \ln \frac{a^2}{r_t^2}}{7.082\times 10^{-3} h \Delta P_t}$$

where:

$$\Delta P_t=\left[1-\frac{a^2}{r_t^2}\frac{Po}{Pu}\right]Pu$$

and:

$$r_t^2=a^2-\frac{Vt}{\pi h \phi}$$

where, $\mu$ is the viscosity of the test liquid in centipoises,
$a$ is the radius of the test specimen in centimeters,
$V_t$ is the volume of liquid which has entered test specimen at time $t$, in cubic centimeters,
$h$ is the length of the core sample in centimeters,
$\phi$ is the porosity fraction of the core,
$Q_t$ is the rate of flow of liquid into the core at time $t$, in cubic centimeters per second, obtained by graphical differentiation,
$Po$ is the pressure in the test chamber just after introduction of the test liquid, in atmospheres,
$Pu$ is the applied pressure, usually atmospheric, in atmospheres, and
$k$ is the permeability of the test specimen, in darcies.

It is evident that in making the foregoing calculation, any point on the curve representing the influx of liquid into the core as a function of time may be selected. It is preferred, however, that the point selected not be within about the first 10 seconds of flow, because the equation from which the permeability is calculated assumes laminar flow conditions, and laminar flow may not exist during the initial 10 seconds. All of the data needed in the calculation are either known or are determined by inspection of the graph obtained by plotting the corresponding values of liquid influx and time. It will be noted that the volume of liquid influx may be read directly from the graduations on tube 16. The rate of flow of liquid into the core at time $t$ is merely the slope of the curve at the selected time. This slope may be ascertained by inspection, or may be calculated by conventional methods of analytical geometry. Since the slope of a curve may be determined from known values of any two adjacent points, it is evident that actually only two measurements of the volume of liquid influx, together with the time interval between these measurements, need be determined. Where the time interval between the two measurements is relatively short, the curve will be nearly linear between the two points, and hence the slope of the curve between the two points can be calculated with a high degree of accuracy. The median value of liquid influx between the two selected points may be used as $V_t$. Alternatively, a plurality of values of $V_t$ may be measured during the experiment, together with the time intervals therebetween, a median value may be used as $V_t$ in the calculation of permeability, and the slope of the curve at $V_t$ may be determined by usual curve-fitting techniques.

In the method of calculating the core permeability, it is assumed that the pressure difference across the invaded zone of the core is the applied pressure (atmospheric) less the residual pressure to which the container was evacuated, adjusted for the compression occurring within the core as the core is invaded by the test liquid. It is evident that the vapor pressure exerted by the test liquid is neglected in the calculation. No serious error results therefrom where the measurements are made after the first 10 seconds of flow. The system should be evacuated to a pressure less than 10 millimeters of mercury, and pressures not in excess of 2 millimeters of mercury are preferred. When low pressures are employed, the test liquid may be introduced to the core under the application of atmospheric pressure, and the need for auxiliary pressuring devices is avoided. It will be evident that it is possible to conduct core tests using the method and apparatus of this invention without evacuating the chamber prior to introduction of the test liquid, provided that after the vessel is inverted sufficient pressure is applied to cause the test liquid to enter the core at a reasonable rate. For example, the system may be subjected to an external pressure of about 3 atmospheres absolute after the container is inverted. The test otherwise will be made in the manner described.

It will be evident that test liquids other than water can be used. Valuable information may be gained by using as test liquids materials which simulate the crude oil which is to be produced from the subterranean reservoir from which the core sample is taken. It is preferred, however, to use as a test fluid a material having a relatively high boiling point (low vapor pressure) so that the necessity of applying external pressure to cause invasion of the core at a reasonable rate is avoided. Accordingly, it is preferred to use low-volatility materials employed in laboratory tests to simulate crude oil, rather than crude oil itself, which may contain some very low-boiling constituents. Otherwise, the low pressure to which the vessel is evacuated will result in a "topping" of the crude, and an abnormally high vapor pressure within the system.

It is evident that the apparatus and method of this invention may be modified without departing from the scope and spirit of the invention. For example, alternative support means for the test specimen will be readily apparent to those skilled in the art.

As a specific example of the method of this invention, a core sample obtained from a subterranean formation is treated with acetone to remove the liquid contents thereof, and then is dried to remove the residual acetone. The ends of the cylindrical specimen are covered with an adhesive sealant, and the specimen is inserted within chamber 12 of the test apparatus depicted in FIGURE 1. Based upon the volume of the core sample, it is estimated that 200 cubic centimeters of liquid will be required to fill chamber 12 and tube 16 to about the level of the zero graduation. A tubular, graduated segment is snapped in place around tube 16 of the test apparatus, and the test chamber is evacuated by opening the valve controlling conduit 20 and connecting conduit 20 to a vacuum pump. The pressure within the vessel is reduced to 2 millimeters of mercury, and the valve controlling conduit 20 is then closed and the vacuum pump is disconnected. Two hundred cubic centimeters of water is introduced into chamber 14 through valve-controlled conduit 22, and the controlling valve is then closed. The test apparatus is then inverted and the sliding, graduated, tubular segment is adjusted so that the meniscus of the water level within tube 16 is at the zero indicator. Now conduit 22 is opened, and after the elapse of 30 seconds, the meniscus level in tube 16 is recorded. After the elapse of another 10 seconds, the meniscus level is again recorded, and so forth until 5 points have been obtained.

The volume of water which has entered the core, as indicated by the reading of the graduate corresponding to the 40-second reading, is selected for calculating the permeability of the core. From the 5 determined values of the quantity of fluid influx into the core, and the corresponding values of time, an equation expressing volume of influx as a function of time is derived by conventional analytical geometric techniques. This equation is differentiated to obtain the slope of the curve at the selected time, 40 seconds. The core dimensions being known, the permeability of the core is determined by substitution in the foregoing equations.

The embodiments of the invention in which a particular property or privilege is claimed are defined as follows:

1. The method of determining the permeability of a porous cylindrical specimen of uninterrupted exterior surface to planar, radial flow comprising placing the peripheral surface of said specimen in contact with a body of test liquid, determining the total volume of said liquid and specimen, then applying to said liquid a pressure substantially in excess of the initial pressure within said specimen to cause said liquid to flow into said specimen, then again measuring the total volume of said liquid and specimen, at a plurality of instances during the period of flow, measuring the time interval between said instances, and from the measured quantities calculating the permeability of said specimen to said liquid.

2. A method in accordance with claim 1 in which said specimen is evacuated to a low subatmospheric initial pressure and said applied pressure is substantially atmospheric pressure.

3. A method in accordance with claim 2 in which said test liquid is water.

4. The method for determining the permeability of a porous cylindrical specimen of uninterrupted exterior surface to planar, radial flow comprising sealing the top and bottom surfaces of said specimen with a liquid-impervious material, placing said specimen in a sealed container, evacuating said container to a pressure of not more than about 10 millimeters of mercury, submerging said specimen in a test liquid within said chamber, determining the total volume of said liquid and specimen, then opening said container to the atmosphere, then again measuring the total volume of said liquid and specimen at a plurality of instances during the period of flow, measuring the time interval between said instances, and from the measured quantities calculating the permeability of said specimen to said liquid.

5. A method in accordance with claim 4 in which said liquid is water.

References Cited in the file of this patent

UNITED STATES PATENTS

| | | |
|---|---|---|
| 2,537,668 | Hebard | Jan. 9, 1951 |
| 2,770,885 | Mapes | Nov. 20, 1956 |
| 2,886,964 | Shappiro et al. | May 19, 1959 |

FOREIGN PATENTS

| | | |
|---|---|---|
| 504,119 | Canada | July 6, 1954 |